United States Patent
Lai

(10) Patent No.: US 7,261,577 B1
(45) Date of Patent: Aug. 28, 2007

(54) CARD CONNECTOR CAPABLE OF PREVENTING ELECTRONIC CARD FROM ACCIDENTAL DISENGAGEMENT THEREFROM

(75) Inventor: Yaw-Huey Lai, Taipei County (TW)

(73) Assignee: Tai-Sol Electronics Co., Ltd., Taipei (TW)

( * ) Notice: Subject to any disclaimer, the term of this patent is extended or adjusted under 35 U.S.C. 154(b) by 0 days.

(21) Appl. No.: 11/637,016

(22) Filed: Dec. 12, 2006

(30) Foreign Application Priority Data

Sep. 29, 2006 (TW) .............................. 95217475 U

(51) Int. Cl.
H01R 13/62 (2006.01)
(52) U.S. Cl. ..................................... 439/159
(58) Field of Classification Search ................ 439/159, 439/630, 327, 328
See application file for complete search history.

(56) References Cited

U.S. PATENT DOCUMENTS 6,520,783 B2 * 2/2003 Hsu ............................ 439/157
6,802,726 B2 * 10/2004 Chang ........................ 439/159
6,934,159 B2 * 8/2005 Nogami ...................... 361/726
6,976,880 B1 * 12/2005 Chi-te et al. ................ 439/630
7,033,190 B1 * 4/2006 Chen .......................... 439/159
7,104,820 B1 * 9/2006 Lu et al. ..................... 439/159
7,175,452 B1 * 2/2007 Lin et al. .................... 439/159
7,195,501 B2 * 3/2007 Zhao .......................... 439/159

FOREIGN PATENT DOCUMENTS

TW 568424 12/2003

* cited by examiner

Primary Examiner—Tulsidas C. Patel
Assistant Examiner—Harshad C Patel
(74) Attorney, Agent, or Firm—Bacon & Thomas, PLLC

(57) ABSTRACT

A card connector capable of preventing a card from accidental disengagement therefrom includes a housing having a base plate, a stationary terminal area located at a first side of the base plate, a slide way located at a second side of the base plate, and a recession formed at a front end of the slide way; a slide member slidably mounted at a second side of the stationary terminal area and having a top guard; and an anti-run member having a main body, a plurality of fastening pieces bending and extending upward from the main body, and a buckle piece bending and extending upward from a front end of the main body. The fastening pieces are mounted onto the slide member. The buckle piece is wider than the main body.

7 Claims, 10 Drawing Sheets

CARD CONNECTOR CAPABLE OF PREVENTING ELECTRONIC CARD FROM ACCIDENTAL DISENGAGEMENT THEREFROM

BACKGROUND OF THE INVENTION

1. Field of the Invention

The present invention relates generally to electronic card connectors, and more particularly, to a card connector capable of effectively preventing a card from accidental disengagement therefrom.

2. Description of the Related Art

A conventional card connector, as shown in FIG. 14 and disclosed in Taiwan Patent Publication No. 568,424, includes a base 2, a slide way 23 formed at the right side of the base 2, a recession 231 formed at a midsection of the slide way 23, a lock-up means longitudinally slidably mounted above the slide way 23, and a buckle member 34 mounted at a bottom side of the lock-up means and having a convexity 341 formed at a front end thereof. When an electronic card 8 having a concavity 82 formed at one side thereof and a side portion 81 formed at a front corner thereof is initially inserted into the card connector, the card 8 squeezes the convexity 341 to enable it to downward engage the recession 231 and to enable the card 8 to pass over the convexity 341. When the side portion 81 contacts against the push portion 33, the convexity 341 enters the concavity 82. When the card 8 continues to enter, the card 8 contacts against the lock-up means and pushes it to move backward and then the lock-up means drives the buckle member 34 to move backward; meanwhile, the convexity 341 disengages from the recession 231 and then climbs the slide way 23 and the convexity 341 still engages the concavity 82. Because the slide way 23 supports the convexity 341, the convexity 241 is not subject to disengagement from the concavity 82, thus securely fastening the card 8.

However, when the card 8 squeezes the convexity 341, the resilience of the convexity 341 is affected very much and the convexity 341 limitedly engages the concavity 82. Thus, the convexity 341 easily disengages from the concavity 82, when the card connector falls on the ground or be violently shocked, to fail to lock up the card 8, thus failing to effectively prevent the card from disengagement from the card connector.

SUMMARY OF THE INVENTION

The primary objective of the present invention is to provide a card connector which can effectively prevent a card from accidental disengagement therefrom.

The foregoing objective of the present invention is attained by the card connector composed of a housing, a slide member, and an anti-run member. The housing includes a base having a base plate, a stationary terminal area located at a first side of the base plate for mounting conductive terminals, and a slide way formed on the base plate. The slide member is slidably mounted at a second side of the stationary terminal and located on the slide way for slidable movement along the slide way. The anti-run member includes a main body, a plurality of fastening pieces bending and extending upward, and a buckle piece bending and extending upward from a front end of the main body. The fastening pieces are fixed onto the slide member. A recess is formed at a front end of the slide way. A top guard is formed on the slide member. A predetermined gap is formed between the top guard and the slide way. The main body is mounted in the predetermined gap between the top guard and the slide way. The buckle piece is larger than the main body in width. The buckle piece at a rear end thereof located close to a second side is connected with the main body. The buckle piece at the rear end located close to a first side laterally extends beyond a lateral edge of the main body. When the slide member is moved to a rear end of the slide way, the rear end of the buckle piece, close to the first side, is buckled into a concavity located at one side of the card. The rear end of the buckle piece, close to the second side, lies on the slide way to be supported by the slide way. In light of this, the card can be stably engaged to avoid disengagement from the card connector while inserted.

DETAILED DESCRIPTION OF PREFERRED EMBODIMENTS

Figure 1:
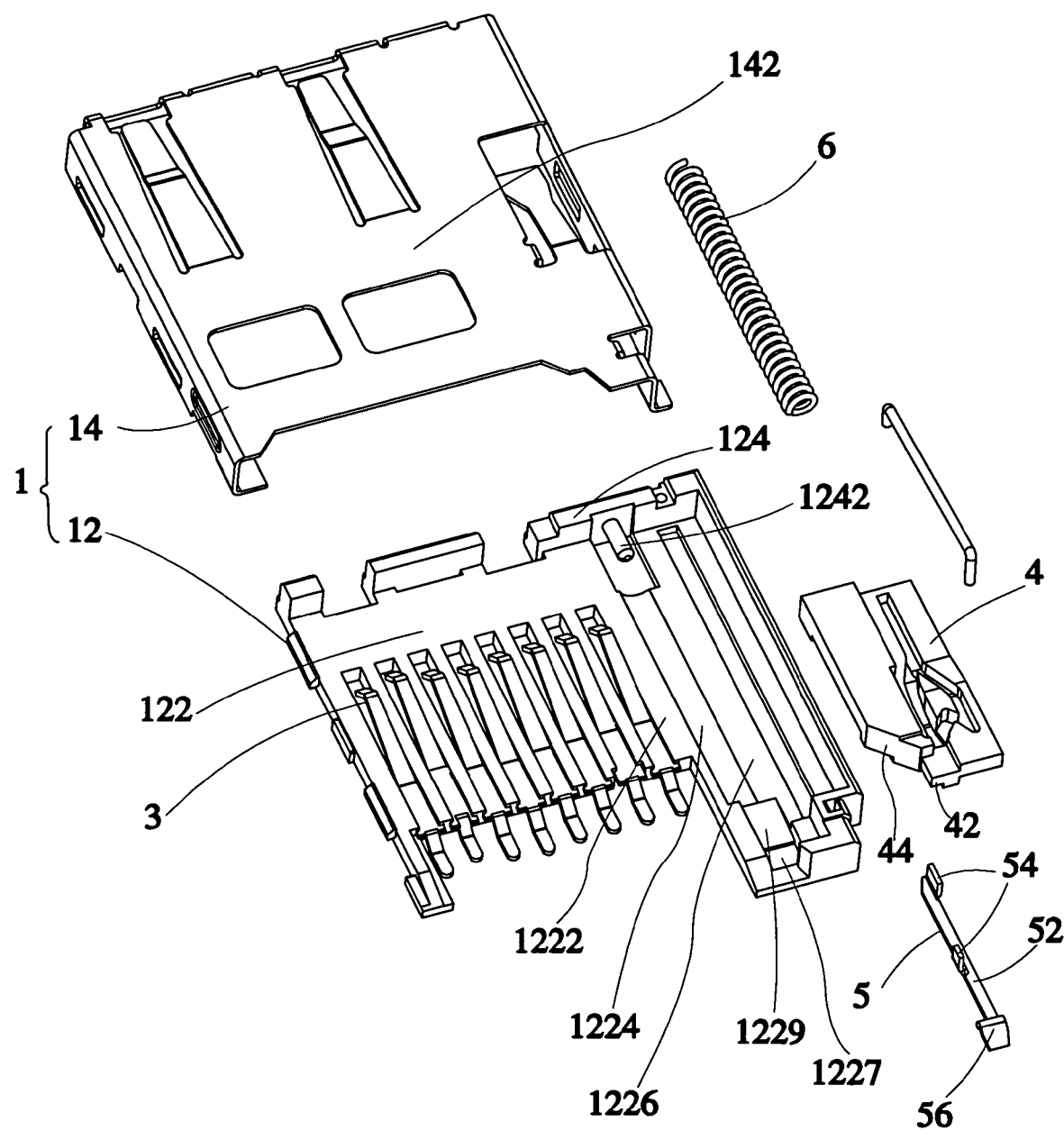
FIG. 1 is an exploded view of a preferred embodiment of the present invention.
Figure 2:
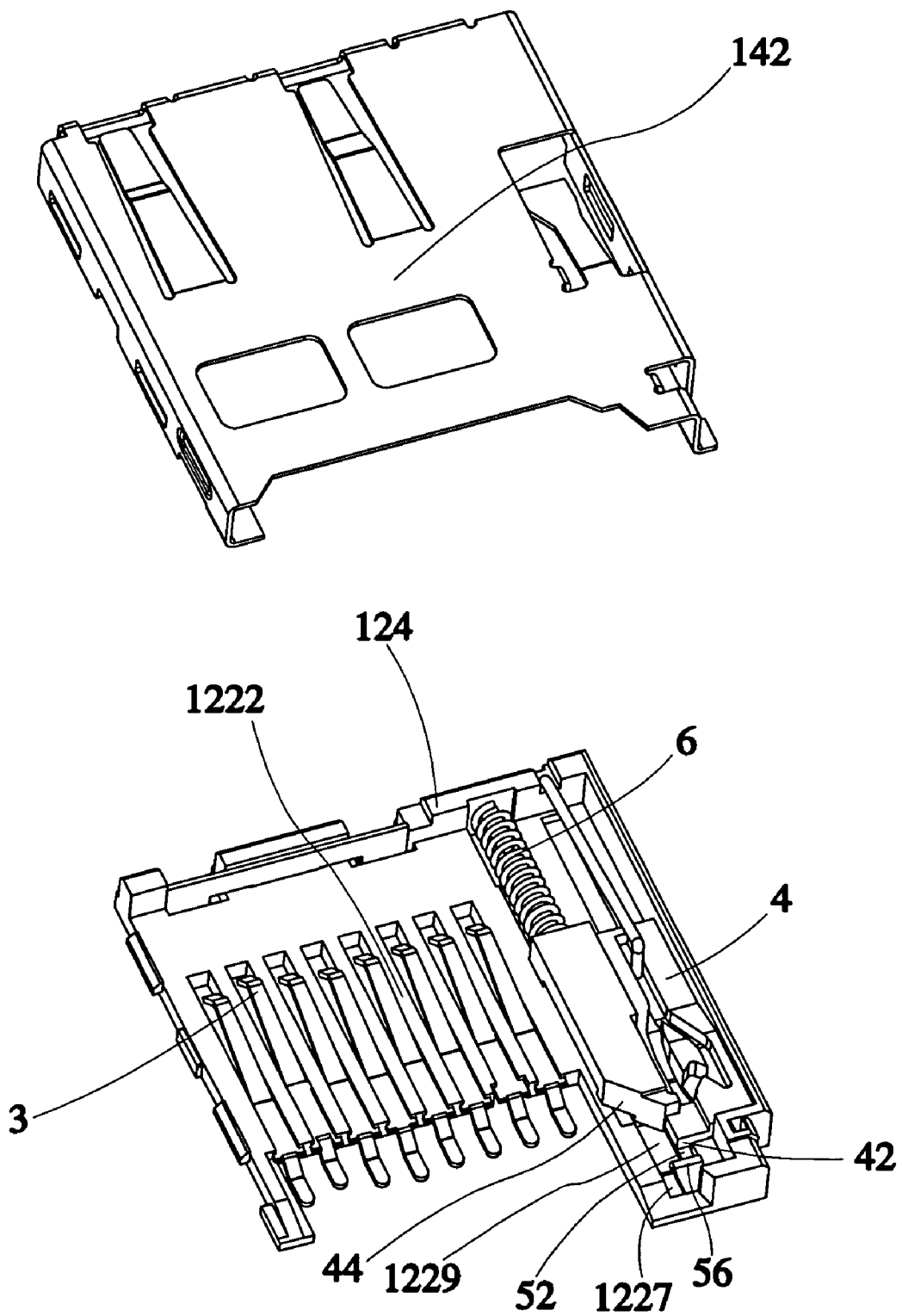
FIG. 2 is a perspective view of the preferred embodiment of the present invention which housing is dismantled.
Figure 3:
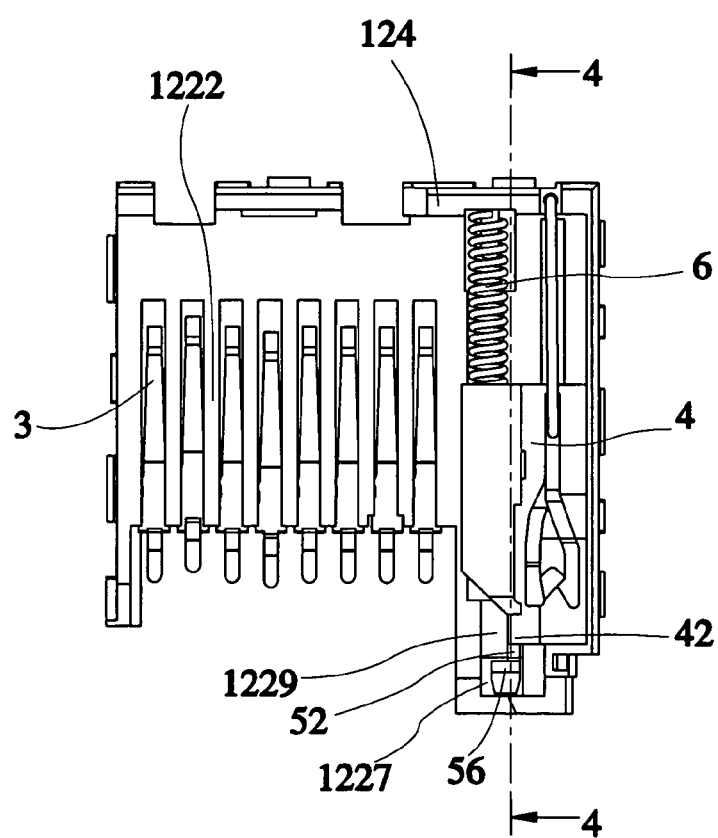
FIG. 3 is a top view of the preferred embodiment of the present invention which housing is dismantled.
Figure 4:
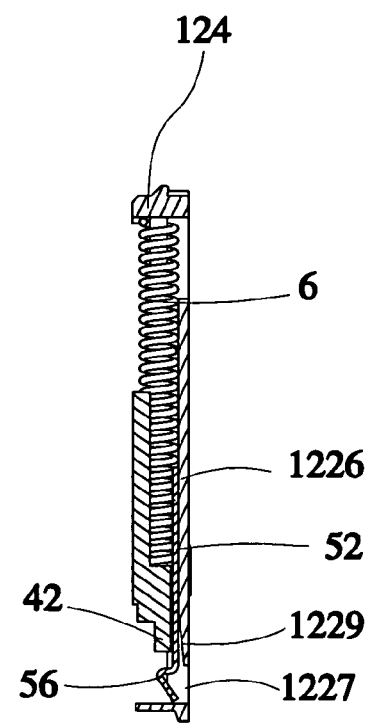
FIG. 4 is a cross-sectional view taken along a line 4-4 indicated in FIG. 3.
Figure 5:
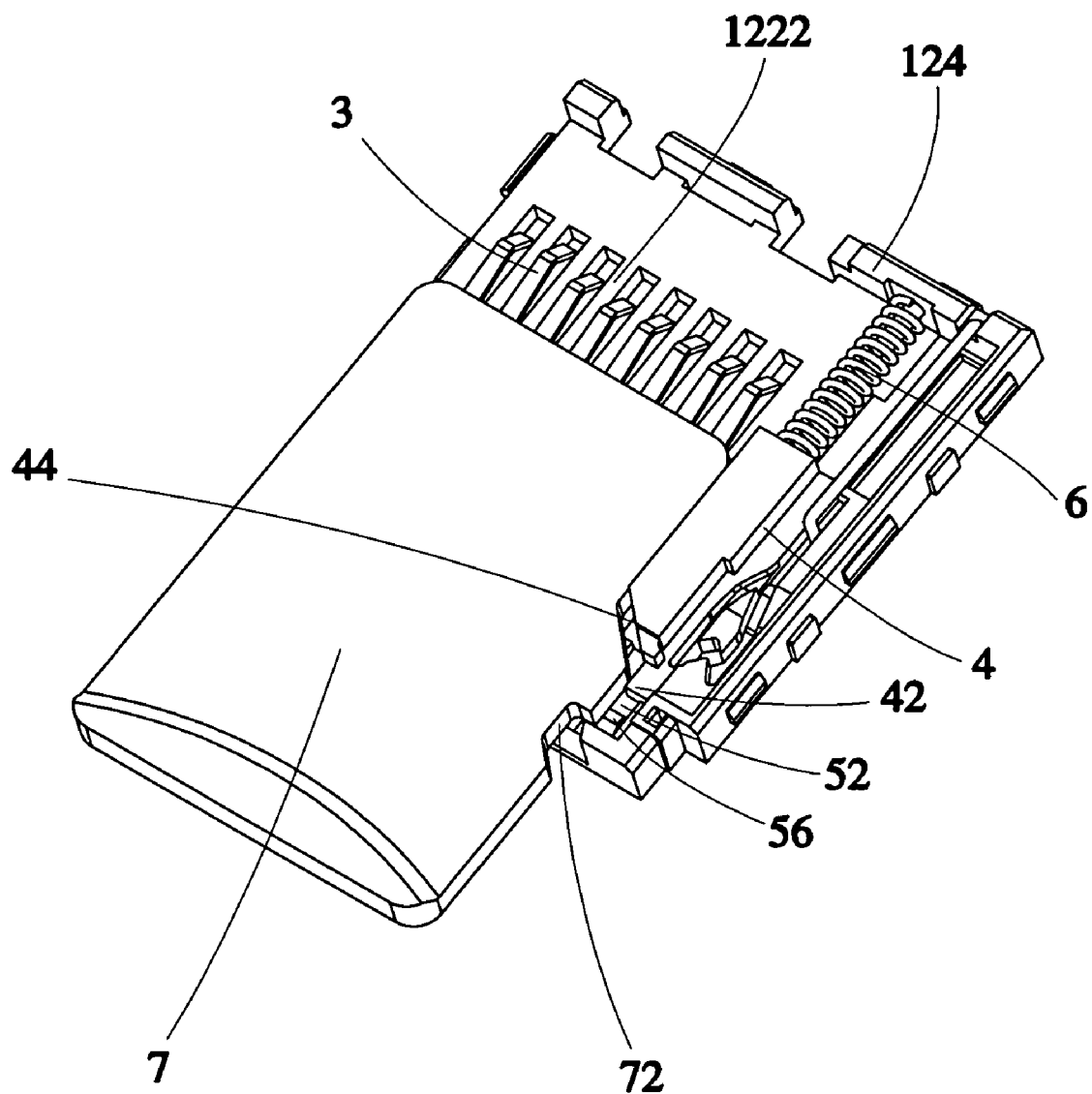
FIG. 5 is a perspective view of the preferred embodiment of the present invention in action, illustrating an electronic card is initially inserted therein.
Figure 6:
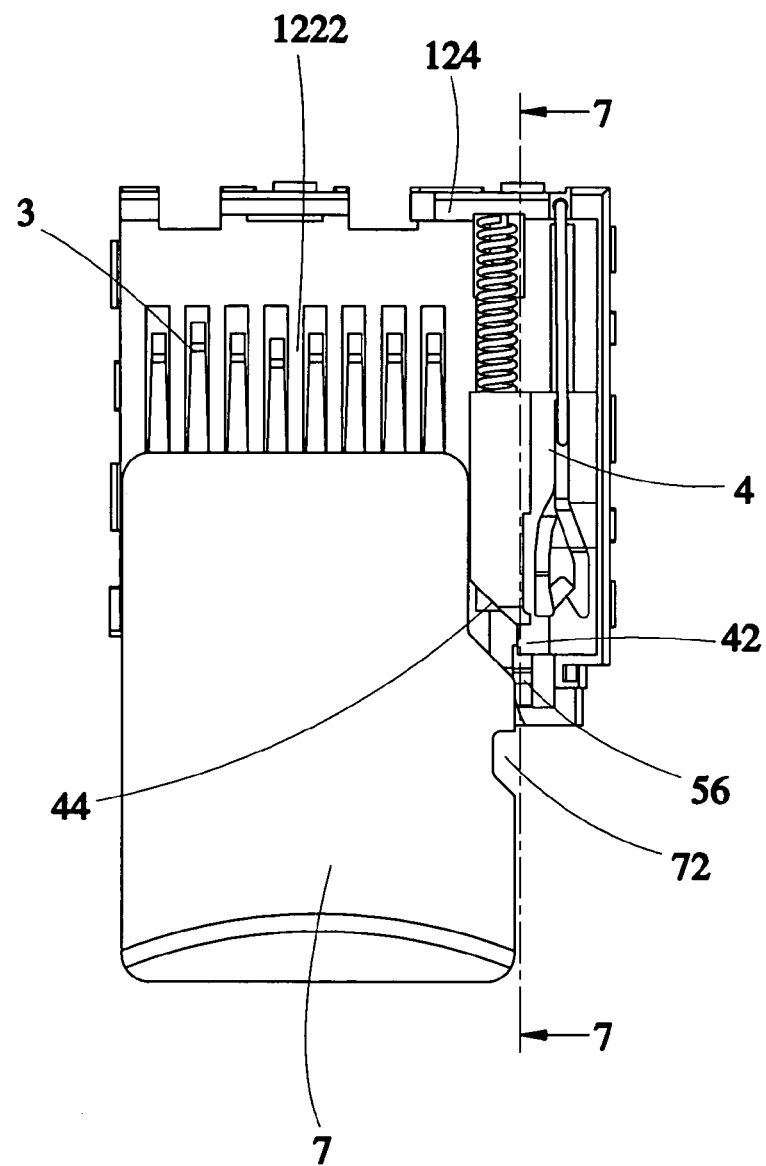
FIG. 6 is a top view of FIG. 5.
Figure 7:
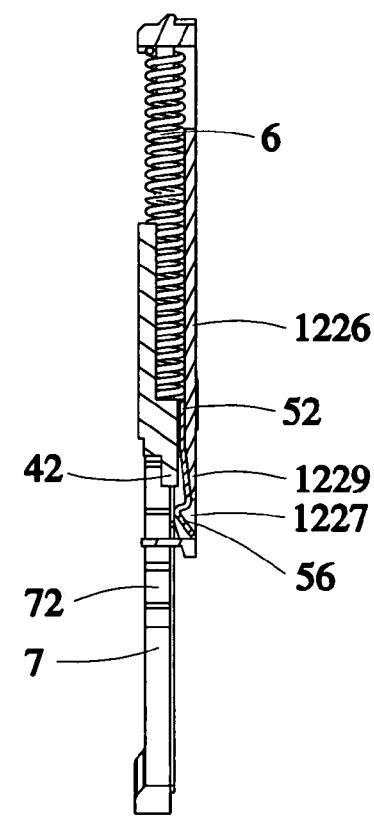
FIG. 7 is a cross-sectional view taken along a line 7-7 indicated in FIG. 6.
Figure 8:
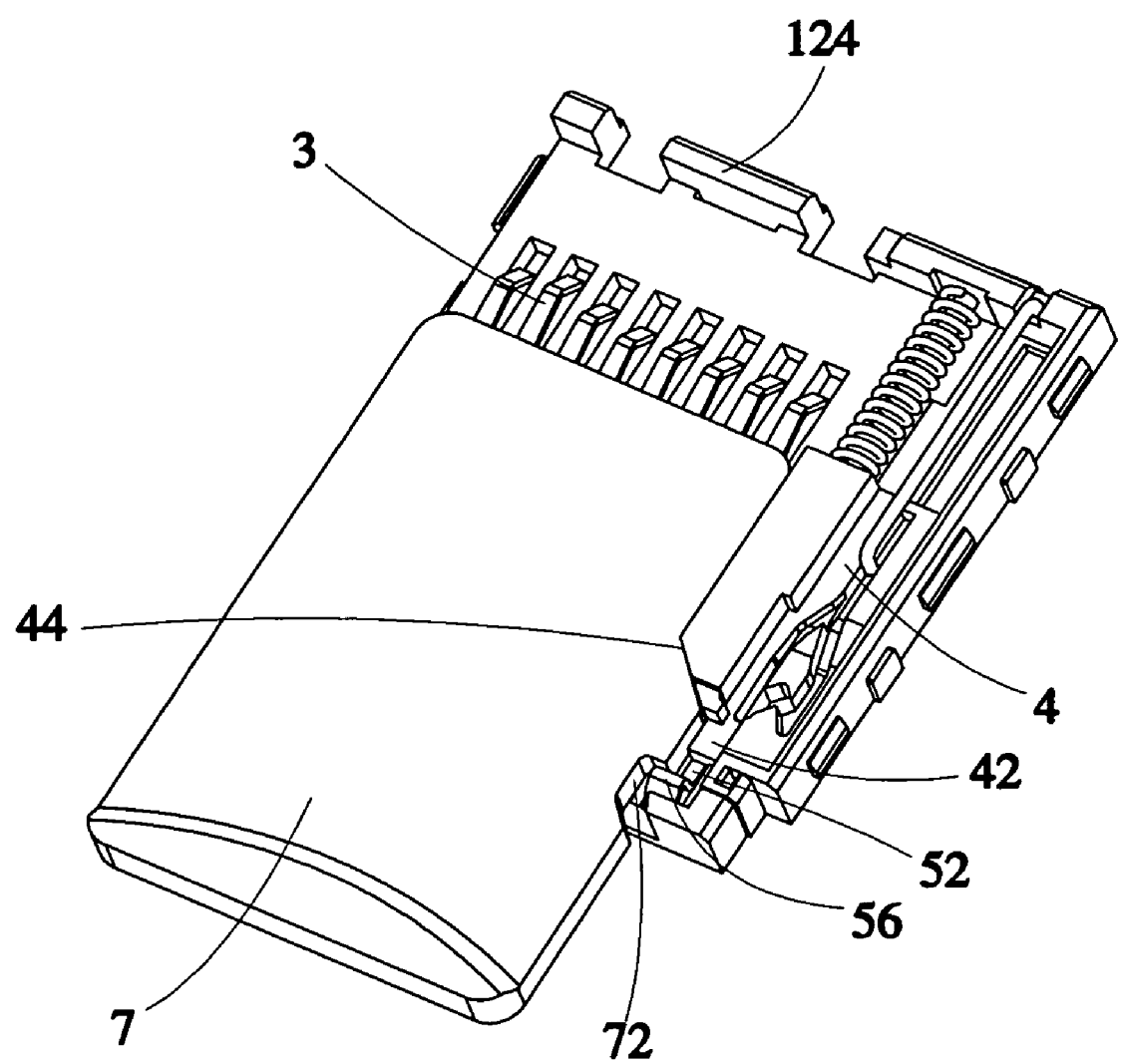
FIG. 8 is similar to FIG. 5, illustrating the buckle piece is buckled into the concavity of the card.
Figure 9:
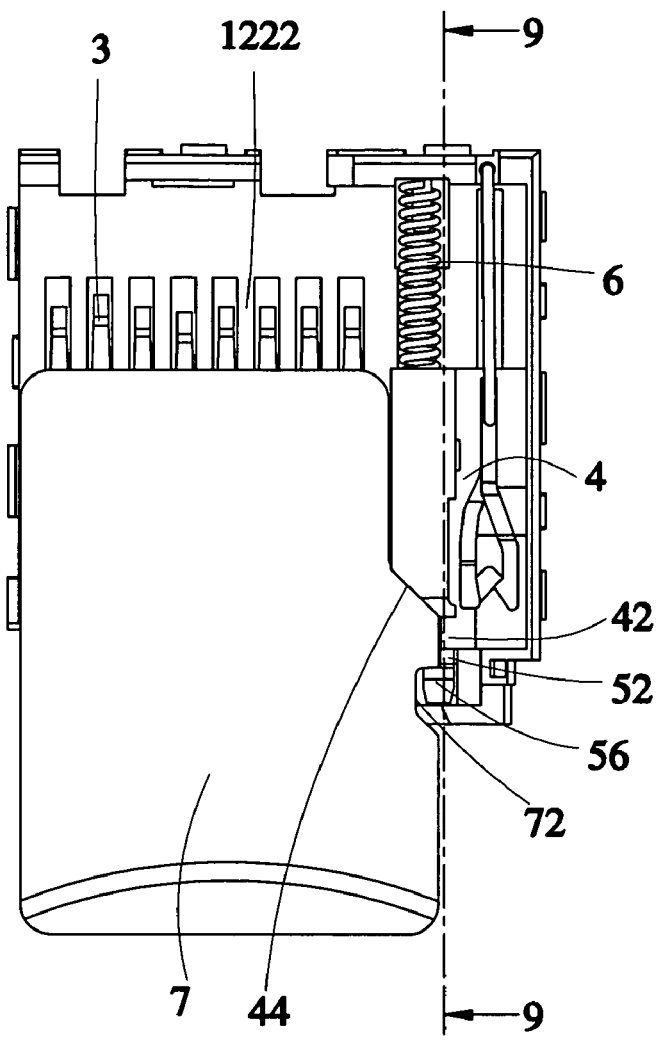
FIG. 9 is a top view of FIG. 8.
Figure 10:
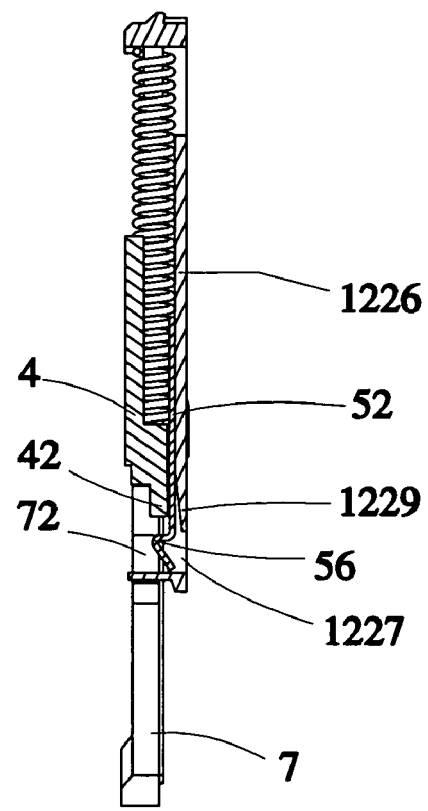
FIG. 10 is a cross-sectional view taken along a line 10-10 indicated in FIG. 9.
Figure 11:
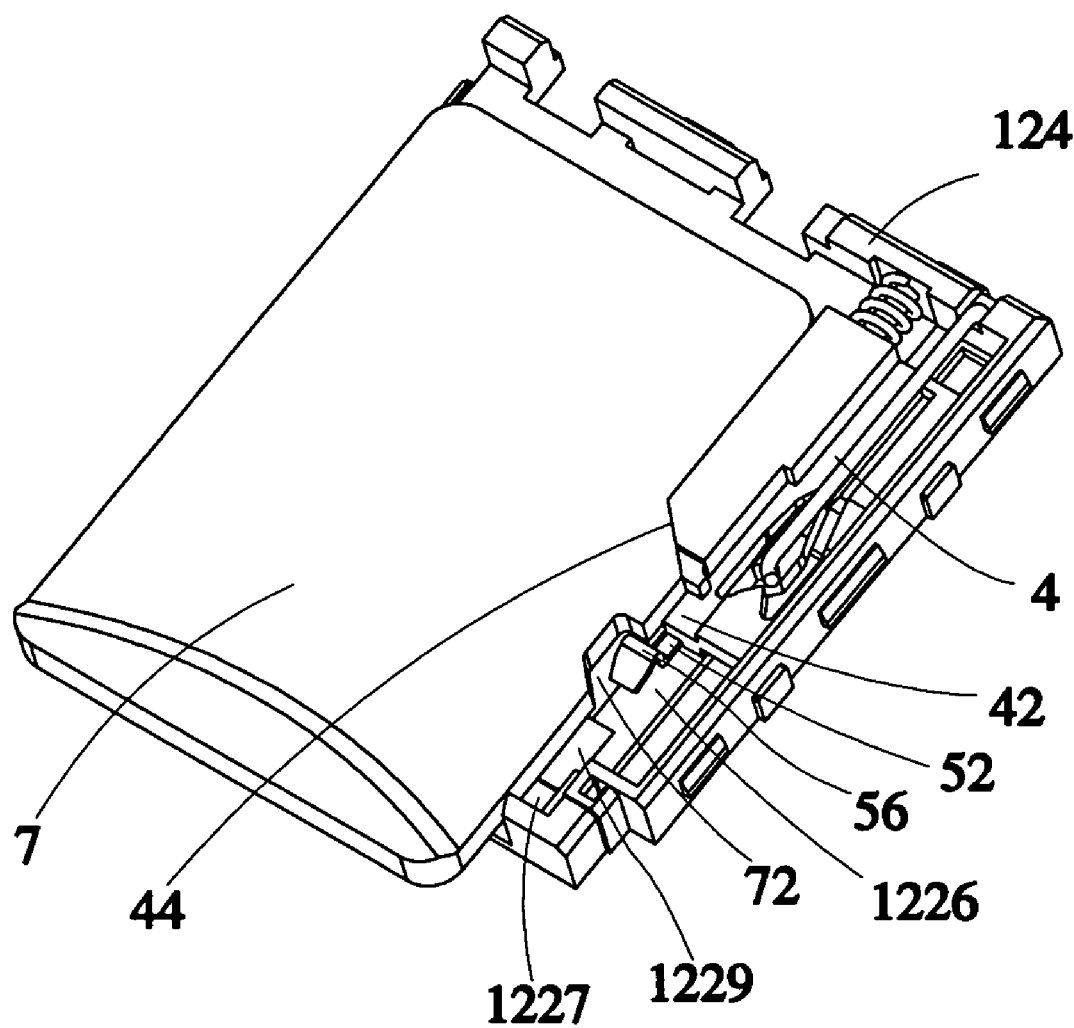
FIG. 11 is similar to FIG. 5, illustrating the card is fully inserted into the card connector.
Figures 12, 13:
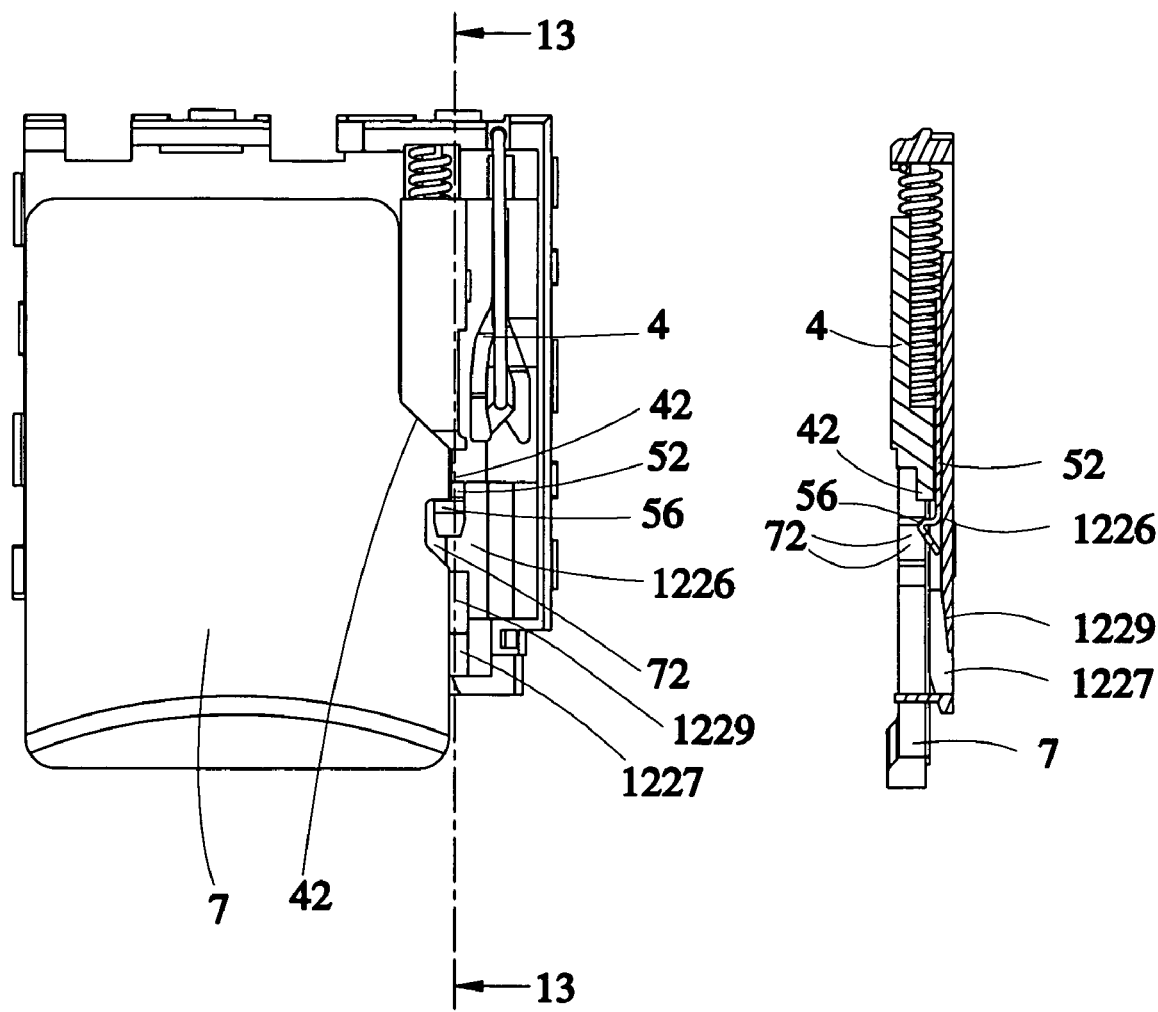
FIG. 12 is a top view of FIG. 11.
FIG. 13 is a cross-sectional view taken along a line 13-13 indicated in FIG. 12.
Figure 14:
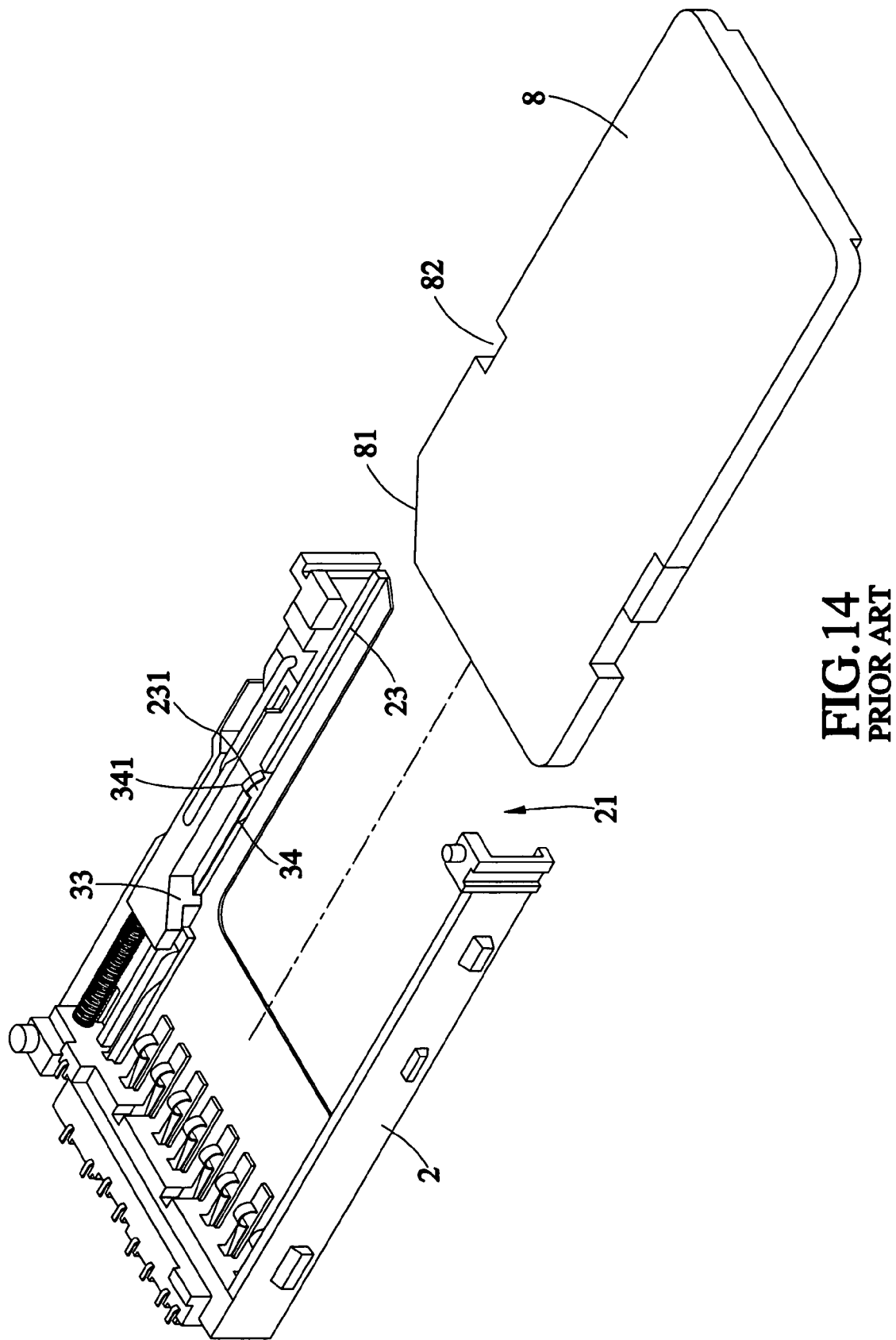
FIG. 14 is a perspective view of the conventional card connector.

Referring to FIGS. 1-13, a card connector capable of preventing an electronic card from accidental disengagement therefrom, constructed according to a preferred embodiment of the present invention, is composed of a housing 1, a group of conductive terminals 3, a slide member 4, an anti-run member 5, and a spring 6.

The housing 1 includes a base 12 and a cover member 14.

The base 12 includes a base plate 122 and a rear plate 124 extending vertically upward from a rear end edge of the base plate 122. An electronic card 7 having a concavity 72 can be inserted into the card connector from a front end of the base plate 122. The base plate 122 has a stationary terminal area 1222 formed at a first side thereof for mounting the conductive terminals 3, a groove 1224 formed at a second side thereof and located close to the stationary terminal area 1222 and extending along a direction that the card 7 is inserted, and an elongated slide way 1226 formed at a second side of the groove 1224 and extending along the direction that the card 7 is inserted for supporting the anti-run member 5. The slide way 1226 is the same as the base plate 122 in height. An inclined guide portion 1229 is formed at front ends of the groove 1224 and the slide way 1226. The guide portion 1229 at a rear end thereof located close to a first side thereof is connected with a front end of the groove 1224. The guide portion 1229 at the rear end thereof located close to a second end thereof is connected with a front end of the slide way 1226. A recess 1227 is formed at a front end of the guide portion 1229. A projecting bar 1242 is formed on the rear plate 124, corresponding to the groove 1224 and protruding forward.

The cover member 14 is buckled onto the base 12, including a top plate 142. The card 7 is located between the base plate 122 and the top plate 142 while inserted.

The conductive terminals 3 are mounted to the stationary terminal area 1222.

The slide member 4 is slidably mounted to a second side of the stationary terminal area 1222 and located above the groove 1223 and the slide way 1226, for slidable movement along the direction that the card 7 is inserted. The slide member 4 includes a top guard 42 extending along the direction that the card 7 is inserted. The top guard 42 is covered above the slide way 1226. A predetermined gap is formed between the top guard 42 and the slide way 1226. The slide member 4 further includes a push portion 44 extending toward a first side of the top guard 42 from a top side thereof.

The anti-run member 5 includes a main body 52, two fastening pieces 54 bending and extending upward from a rear end and a midsection of the main body 52 respectively, and an arched buckle piece 56 bending and extending upward from a front end of the main body 52. The fastening pieces 54 are mounted to a bottom side of the slide member 4. The main body 52 and the buckle piece 56 are mounted below the top guard 42 of the slide member 4. The anti-run member 5 is located in the predetermined gap between the top guard 42 and the slide way 1226. The buckle piece 56 has a width larger than that of the main body 52. The buckle piece 56 at a rear end thereof located close to a second side thereof is connected with the main body 52. The buckle piece 56 at the rear end thereof located close to a first side thereof laterally extends beyond a lateral edge of the main body 52. Before the card 7 is inserted into the card connector, the buckle piece 56 is located above the recess 1227. When the card 7 is fully inserted into the card connector, the buckle piece 56 at a part thereof located close to the first side thereof is located above the groove 1224 and buckled into the concavity 72 of the card 7; the buckle piece 56 at a part thereof located close to the second side thereof lies on the slide way 1226.

The spring 6 includes two ends inserted onto the projecting bar 1242 of the rear plate 124 and onto a part of the slide member 4 corresponding to the front end of the slide member 4 respectively.

When the card connector of the present invention is being assembled, first mount the two fastening pieces 54 of the anti-run member 5 to the bottom side of the slide member 4, and then mount the slide member 4 in the base 12, enabling the buckle piece 56 to be located above recess 1227 and the main body 52 to be located on the slide way 1226; mount the spring 6 to between the rear plate 124 and the slide member 4 and then mount the cover member 14 onto the base 12.

While the card 7 is initially inserted into the card connector, the card 7 squeezes the buckle piece 56 of the anti-run member 5 to move downward and then the buckle piece 56 enters the recess 1227 to enable the card 7 to pass over the buckle piece 56 and continue to be inserted further. While a front end of the card 7 contacts the push portion 44 of the slide member 4, a first side of the buckle piece 56 correspondingly engages the concavity 72 of the card 7. While the card 7 continues to enter further, its front end pushes the push portion 44 to further push the slide member 4 to move toward the rear plate 124 and then the anti-run member 5 is moved along with the rear plate 124. In the meantime, the buckle piece 56 climbs the slide way 1226 along the guide portion 1229, a second side of the buckle piece 56 lies on the slide way 1226 and be blocked by the slide way 1226, and thus the buckle piece 56 keeps engagement in the concavity 72.

When the card connector is violently shocked and wobbled, because the buckle piece 56 lies on the slide way 1226 and the slide way 1226 upwardly supports the buckle piece 56, the buckle portion 56 fails to disengage from the concavity 72 and keeps secure engagement in the concavity 72, thus securely preventing the card 7 from backing and disengagement from the card connector.

In the present invention, the base 12 has the slide way 1226 located therein and the slide way 1226 has the guide portion 1229 located at the front end thereof. When the card 7 pushes the slide member 4 to move backward, the buckle piece 56 climbs the slide way 1226 along the guide portion 1229. By means of the upward support of the slide way 1226 for the buckle piece 56, even if the card connector is violently shocked or wobbled, the buckle piece 56 will impossibly disengage from the concavity 72 of the card 7 and still securely engage the concavity 72 to effectively prevent the card 7 from backing and disengagement from the card connector.

It is to be noted that the above-mentioned first and second sides are the left and right sides respectively in this embodiment. The first side can alternatively be the right side and the second side can alternatively be the left side, which are the equivalent interchange of the present invention and fall in the scope of the appended claim.

The guide portion 1229 is located at both of the front sides of the groove 122 and the slide way 1226 to be wide enough to enable the buckle piece 56 to be stably and successfully moved along the guide portion 1229 to the slide way 1226. In this regard, the guide portion can be alternatively formed at the front end of the slide way with the same width as the above-mentioned embodiment; likewise, the guide portion 1229 has a recess formed at a front end thereof, and the anti-run member and other components are consistent with those of the first embodiment in structure and location of assembly. The buckle piece 56 at a part thereof located close to the first side thereof correspondingly engages the concavity of the card. The buckle piece 56 at another part thereof located close to the second side thereof correspondingly lies on the slide way and supported by the slide way. Through the support of the slide way 1226, even if the card connector is violently shocked or wobbled, the buckle piece 56 will not disengage from the concavity of the card to effectively prevent the card from backing and disengagement from the card connector.

Although the present invention has been described with respect to a specific preferred embodiment thereof, it is no way limited to the details of the illustrated structures but changes and modifications may be made within the scope of the appended claims.

What is claimed is:

1. A card connector capable of preventing a card from disengagement therefrom, said card having concavity formed at one side thereof, said card connector comprising a housing, a slide member, and an anti-run member, wherein said housing having a base, said base having a base plate, a stationary terminal area formed at a first side of said base plate for mounting conductive terminals, a slide way formed at a second side of said base plate for supporting said anti-run member, and a recession formed at a front end of said slide way;

said slide member slidably mounted at a second side of said stationary terminal area and located on said slide way for slidable movement along a direction that the card is inserted into said card connector, said slide member having a top guard, a predetermined gap being formed between said top guard and said slide way;

said anti-run member having a main body, a plurality of fastening pieces bending upward and extending from said main body, and a buckle piece bending upward and extending from a front end of said main body, said fastening piece being mounted onto said slide member, said main body being located in said gap between said top guard and said slide way; and said buckle piece having a width larger than that of said main body, said buckle piece at a rear end thereof located close to a second thereof being connected with said main body, said buckle piece at the rear end thereof located close to a first side thereof laterally extending beyond a lateral edge of said main body; when said slide member is moved to a rear end of said slide way, said buckle piece at the rear end thereof close to the first side is buckled into said concavity of the card, said buckle at the rear end thereof close to the second side lies on said slide way to be supported by said slide way.

2. The card connector as defined in claim 1, wherein the first side is the left side and the second side is the right side.

3. The card connector as defined in claim 1, wherein the first side is the right side and the second side is the left side.

4. The card connector as defined in claim 1 or 2 or 3, wherein said housing further comprises an inclined guide portion located between said slide way and said recession.

5. The card connector as defined in claim 1 or 2 or 3, wherein said base further comprises a groove located at a second side thereof and abutting said stationary terminal area; said slide way is formed at a second side of said groove; said guide portion is located at frond ends of said groove and said slide way respectively, said guide portion at a rear end thereof located close to a first side thereof being connected with the front end of said groove, said guide portion at the rear end thereof located close to a second side thereof being connected with the front end of said slide way; said recession is located at a front end of said guide portion.

6. The card connector as defined in claim 1 or 2 or 3, wherein said slide way is as high as said base plate.

7. The card connector as defined in claim 1 or 2 or 3, wherein said buckle piece is arched.

* * * * *